(12) United States Patent
Sundaram et al.

(10) Patent No.: US 10,350,538 B2
(45) Date of Patent: Jul. 16, 2019

(54) HIGH TEMPERATURE PRESSURE SWING ADSORPTION FOR ADVANCED SORPTION ENHANCED WATER GAS SHIFT

(71) Applicant: ExxonMobil Research and Engineering Company, Annandale, NJ (US)

(72) Inventors: Narasimhan Sundaram, Annandale, NJ (US); Hans Thomann, Bedminster, NJ (US); David C. Calabro, Bridgewater, NJ (US); Frank Mittricker, Jamul, CA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 175 days.

(21) Appl. No.: 15/653,833

(22) Filed: Jul. 19, 2017

(65) Prior Publication Data

US 2018/0036674 A1    Feb. 8, 2018

Related U.S. Application Data

(60) Provisional application No. 62/370,890, filed on Aug. 4, 2016.

(51) Int. Cl.
*B01D 53/047*    (2006.01)
*B01D 53/053*    (2006.01)
(Continued)

(52) U.S. Cl.
CPC ......... *B01D 53/053* (2013.01); *B01D 53/047* (2013.01); *C01B 3/56* (2013.01);
(Continued)

(58) Field of Classification Search
CPC ............ B01D 53/047; B01D 2257/102; B01D 2257/504; B01D 2256/16;
(Continued)

(56) References Cited

U.S. PATENT DOCUMENTS 4,963,339 A * 10/1990 Krishnamurthy .... B01D 53/047
                                                           422/198
5,989,316 A    11/1999 Kuznicki et al.
(Continued)

FOREIGN PATENT DOCUMENTS

| EP | 2220338 B1 | 8/2010 |
|---|---|---|
| EP | 2407421 A1 | 1/2012 |
| WO | 2012003079 A1 | 1/2012 |

OTHER PUBLICATIONS

International Search Report and Written Opinion of PCT/US2017/042763 dated Oct. 10, 2017.
(Continued)

*Primary Examiner* — Thuan D Dang
(74) *Attorney, Agent, or Firm* — Priya G. Prasad; Andrew T. Ward

(57) ABSTRACT

In various aspects, methods are provided for hydrogen production while reducing and/or mitigating emissions during various refinery processes that produce syngas, such as power generation. Syngas can be effectively separated to generate high purity carbon dioxide and hydrogen streams, while reducing and/or minimizing the energy required for the separation, and without needing to reduce the temperature of the flue gas. In various aspects, the operating conditions, such as high temperature, mixed metal oxide adsorbents, and cycle variations, for a pressure swing adsorption reactor can be selected to minimize energy penalties while still effectively capturing the $CO_2$ present in syngas.

18 Claims, 4 Drawing Sheets

(51) Int. Cl.
*C01B 3/56* (2006.01)
*C01B 32/50* (2017.01)

(52) U.S. Cl.
CPC ...... *C01B 32/50* (2017.08); *B01D 2253/1122* (2013.01); *B01D 2253/1124* (2013.01); *B01D 2256/16* (2013.01); *B01D 2256/20* (2013.01); *B01D 2257/108* (2013.01); *B01D 2257/504* (2013.01); *B01D 2259/403* (2013.01); *B01D 2259/4003* (2013.01); *B01D 2259/404* (2013.01); *B01D 2259/40035* (2013.01); *B01D 2259/40043* (2013.01); *B01D 2259/40079* (2013.01); *B01D 2259/40081* (2013.01); *C01B 2203/043* (2013.01); *C01B 2203/0465* (2013.01); *C01B 2203/0475* (2013.01); *Y02C 10/08* (2013.01); *Y02P 20/152* (2015.11); *Y02P 30/30* (2015.11)

(58) Field of Classification Search
CPC .. B01D 2259/40086; B01D 2259/4145; B01D 2259/403; B01D 53/0407; B01D 53/0473; B01D 53/0476; B01D 2259/404; C01B 3/56; C01B 2203/043; C01B 2203/0475; C01B 2203/0465; C01B 2203/146; C01B 21/0466; C01B 21/0045; C01B 21/0455
USPC .................................. 95/96, 130, 139, 97, 98
See application file for complete search history.

(56) References Cited

U.S. PATENT DOCUMENTS

| | | | |
|---|---|---|---|
| 6,068,682 | A | 5/2000 | Kuznicki et al. |
| 6,902,602 | B2 | 6/2005 | Keefer et al. |
| 8,636,969 | B2 | 1/2014 | Weston et al. |
| 8,907,102 | B2 | 12/2014 | Weston et al. |
| 2010/0287981 | A1 | 11/2010 | Chen et al. |
| 2012/0125194 | A1 | 5/2012 | Caram et al. |
| 2012/0288439 | A1 | 11/2012 | Sundaram et al. |
| 2012/0318533 | A1 | 12/2012 | Keller et al. |
| 2013/0333391 | A1 | 12/2013 | Sundaram et al. |
| 2016/0009563 | A1 | 1/2016 | Corma Canos et al. |
| 2017/0136402 | A1 | 5/2017 | Sundaram et al. |

OTHER PUBLICATIONS

Reijers et al., "Modeling Study of the Sorption-Enhanced Reaction Process for CO2 Capture. I. Model Development and Validation", Industrial Engineering Chemistry Research, 2009, pp. 6966-6974, vol. 48, No. 15, ACS Publications.

Wright et al., "CAESAR: Development of a SEWGS model for IGCC", Energy Procedia, 2011, pp. 1147-1154, vol. 4, Elsevier, ScienceDirect.

Du et al., "New High- and Low-Temperature Phase Changes of ZIF-7 Elucidation and Prediction of the Thermodynamics of Transitions", Journal of the American Chemical Society, 2015, pp. 13603-13611, vol. 137, ACS Publications.

Mason et al., "Methane Storage in Flexible Metal-organic Frameworks with Intrinsic Thermal Management", Nature, 2015, pp. 357-361, vol. 527.

Rashidi et al., "Synthesis, Characterization, and Tunable Adsorption and Diffusion Properties of Hybrid ZIF-7-90 Frameworks", AiChE Journal, 2016, pp. 525-537, vol. 62, Wiley Online Library.

Thompson et al., "Tunable CO2 Adsorbents by Mixed-Linker Synthesis and Postsynthetic Modification of Zeolitic Imidazolate Frameworks", Journal of Physical Chemistry C, 2013, pp. 8198-8207, vol. 117, ACS Publications.

Eum et al., "Highly Tunable Molecular Sieving and Adsorption Properties of Mixed-Linker Zeolitic Imidazolate Frameworks", Journal of the American Chemical Society, pp. 4191-4197, vol. 137, ACS Publications.

\* cited by examiner

HIGH TEMPERATURE PRESSURE SWING ADSORPTION FOR ADVANCED SORPTION ENHANCED WATER GAS SHIFT

CROSS-REFERENCE TO RELATED APPLICATIONS

This application claims the benefit of U.S. Provisional Application No. 62/370,890, filed on Aug. 4, 2016, the entire contents of which are incorporated herein by reference.

FIELD

In various aspects, the invention is related to low emission power production with separation and/or capture of resulting emissions.

BACKGROUND

Capture of gases emitted from power plants is an area of increasing interest. Power plants based on the combustion of petroleum products generate carbon dioxide as a byproduct of the reaction. Historically this carbon dioxide has been released into the atmosphere after combustion. However, it is becoming increasingly desirable to identify ways to find alternative uses for the carbon dioxide generated during combustion.

Carbon capture and sequestration (CCS) is at the forefront of the energy industry. CCS generally encompasses the field of capturing waste carbon dioxide from large point sources, such as refineries or coal fired power plants, transporting it to a storage site and depositing it where it will not enter the atmosphere, such as an underground geological formation.

Synthesis gas or "syngas" is a byproduct a variety of refinery process. Syngas is a mixture comprising carbon monoxide, carbon dioxide, and hydrogen. It is produced by gasification (or burning/combustion) of a carbon containing fuel to a gaseous product. Production of syngas is ubiquitous to refinery processing via the inevitable use of furnaces, boilers, reformers and the like found in hydrocarbon processing. Even in emerging technologies, such as fuel cells, syngas is produced as a byproduct along with electricity, water, and heat.

The Water Gas Shift (WGS) reaction is an important player in CCS and the proper handling of syngas. WGS describes the reaction of carbon monoxide and water vapor to form carbon dioxide and hydrogen.

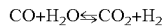

As can be see, the WGS reaction provides a source of hydrogen at the expense of carbon monoxide. Hydrogen is a valuable product and can be used in hydroprocessing applications, which generally refers to conversion of heavy petroleum fractions into lighter ones via hydrocracking. It can also be used to produce ammonia.

Hydrogen is most abundantly produced by steam methane reformers (SMR) in petrochemical facilities. Steam reforming describes the reaction of methane with steam to produce hydrogen and carbon monoxide.

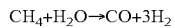

Here, methane is exposed to steam at very high temperatures to form carbon monoxide and hydrogen. In a second stage, additional hydrogen is produced by exposing the carbon monoxide product to the WGS reaction described above.

Sorption Enhanced Water Gas Shift (SEWGS) describes processes where the WGS reaction is combined with $CO_2$ capture. Syngas enters the SEWGS unit where carbon monoxide is treated with steam to produce carbon dioxide and hydrogen. The carbon dioxide is then adsorbed onto an adsorbent producing a nearly pure hydrogen product. Carbon dioxide can then be desorbed and then deposited via the sites CCS facilities.

Conventional SEWGS methods for capturing carbon dioxide tend to reduce the efficiency of the CCS process, due to the additional steam energy required to capture and/or sequester the carbon dioxide. Specifically, conventional processes utilize a costly, energy intensive steam rinse, which creates a large energy penalty on the plant.

U.S. Pat. No. 6,902,602 describes methods for performing separations by swing adsorption where it is desirable to minimize or avoid interaction between one of the components in a gas stream being separated and a component of the gas stream used for purging the swing adsorption apparatus. Separations of hydrogen and carbon dioxide from syngas stream are noted as an example, where it is desirable to avoid contamination of the hydrogen product stream with any oxygen from the typical oxygen-containing purge stream. The separation methods include use of one or more buffer gas steps during a separation, where a buffer different from any other components is used to prevent contamination between steps of a separation process.

U.S. Published Patent Application No. 2012/0125194 describes an autothermal cycle for $CO_2$ capture. A combustion exhaust gas is contacted with an adsorbent bed to adsorb $CO_2$. The $CO_2$ is then removed by contacting the adsorbent with a gas comprising steam. The resulting output gas containing steam and $CO_2$ is conveyed to a vapor recompression system to recover $H_2O$, $CO_2$, and heat. The recovered $H_2O$ and heat are then used to provide steam for the sweep gas. The amount of steam sweep gas required for recovery of $CO_2$ is described as being ~1 mole of steam per mole of input feed gas. The flue gas input feeds are described as having a $CO_2$ content of 15 mol % or less. Thus, the steam/$CO_2$ molar ratio is described as being at least ~6 moles of steam per mole of $CO_2$. The process is described as recovering at least 90% of the carbon in the combustion exhaust gas as part of the output gas.

Other potentially relevant publications can include U.S. Patent Application Publication No. 20120318533, European Patent Application No. EP 2220338, an article by Reijers et al., *Ind. Eng. Chem. Res.*, 2009, 48, 6966, and an article by Wright et al., *Energy Procedia*, 2011, 4, 1457, inter alia.

SUMMARY

Methods for production of $H_2$ and $CO_2$ from a gaseous stream are provided. In certain aspects, the methods include passing a gaseous stream comprising at least about 60 vol % $H_2$ and at least about 10 vol % $CO_2$ into a swing adsorption reactor comprising a plurality of adsorbent beds containing an adsorbent material, the gaseous stream having a pressure between about 10 bara (about 1.0 MPaa) to about 40 bara (about 4.0 MPaa); in a first adsorbent bed, adsorbing $CO_2$ on the adsorbent material at an adsorption temperature of at least 400° C.; wherein the adsorbent material comprises an one of an (i) alkali metal carbonate and an oxide of an alkaline earth metal or a transition metal and (ii) alkaline earth metal carbonate and an oxide of a transition metal; recovering an $H_2$ stream with a purity of at least about 99 vol % from a forward end of the first adsorbent bed, the recovered $H_2$ stream having a pressure that differs from the pressure of the gaseous stream by about 0.5 bar (about 50 kPa) or less; reducing the pressure in the first adsorbent bed to a pressure from about 5 bara (about 500 kPaa) to about 15 bara (1.5 MPaa) by equalizing the first adsorbent bed with a another of the plurality of adsorbent beds via equalization piping; further reducing the pressure the pressure in the first adsorbent bed to a pressure from about 1.0 bara (about 0.1 MPaa) to about 4.0 bara (about 0.4 MPaa) by outputting a blow down stream from at least one end of the first adsorbent bed; and purging the first adsorbent bed with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the gaseous stream, the steam purge containing less than about 1.0 moles of $H_2O$ per mole of $CO_2$ recovered, e.g. less than 0.8 moles of $H_2O$ per mole of $CO_2$ recovered or less than 0.6 moles of $H_2O$ per mole of $CO_2$ recovered. In another aspect the passing, the adsorbing, the recovering, the reducing, further reducing, and the purging comprise a pressure swing adsorption cycle, the gaseous stream and the steam purge comprising at least about 95 vol % of the gases introduced into the swing adsorption reactor during the pressure swing adsorption cycle. The adsorbent may be structured, said structure possessing a void fraction less than 0.3.

The method can further include repressurizing the first adsorbent bed to a pressure of, for example at least about 10 bara (about 1.0 MPaa) with the gaseous stream. In another aspect, the methods may further include reducing pressure by co-current or counter-current blowdowns The in certain aspects, the alkaline earth metal carbonate is magnesium carbonate or calcium carbonate. The adsorbent may also comprise a transition metal oxide of a transition metal that forms an oxide with the metal in a +2 or +3 oxidation state. In another aspect, the adsorbent can include at least one of lithium carbonate and potassium carbonate and at least one of lanthanum oxide, yttrium oxide, and magnesium oxide. In yet another aspect, the alkaline earth metal carbonate is magnesium carbonate or calcium carbonate. In a further aspect, the adsorbent includes at least one of magnesium carbonate and calcium carbonate and at least one of lanthanum oxide, yttrium oxide, and magnesium oxide.

Due to the high temperatures at which the process is initiated, the steam purge can be initiated by contacting the adsorbent material with liquid water, the adsorbent material thereby producing steam for the steam purge.

The adsorption reactor can include multiple beds, for example three adsorbent beds or four adsorbent beds. In cases where the adsorption reactor includes multiple beds, one of the adsorbent beds can be used solely as a storage vessel at any one point in the adsorption cycle. In other cases, where the adsorption reactor includes four adsorbent beds, the first adsorbent bed increases its pressure via equalization with a second adsorbent bed and a third adsorbent bed after feeding, but prior to repressurizing.

In other aspects, the processes disclosed herein in can include zero, one, or two "hold" steps. The hold steps allow for longer equalization times throughout the cycle. Longer equalization times are more conducive to a stable process. In one aspect, the process includes holding the first adsorbent bed for a period of time during which a second adsorbent bed, a third adsorbent bed, and a fourth adsorbent bed are engaged in a blowdown, feeding, and repressurizing step, respectively.

BRIEF DESCRIPTION OF THE FIGURES

FIG. 7 pictorially shows a representative cycle setup of a 4-vessel sorptive arrangement with some level of interconnection between vessels utilizing one, two, or zero holds per quarter cycle.

FIG. 8 pictorially shows the cycle setup of a 4-vessel sorptive arrangement with interconnection between vessels and one vessel of the cycle being utilized as a storage tank only.

DETAILED DESCRIPTION OF THE EMBODIMENTS

Figure 1:
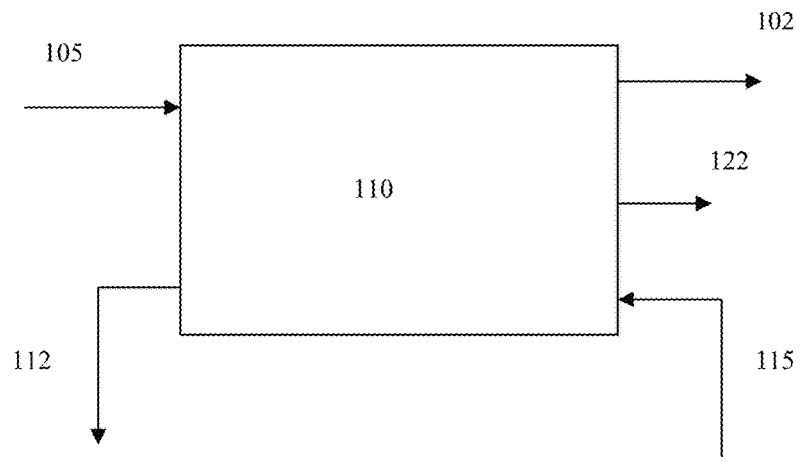
FIG. 1 schematically shows a configuration for a pressure swing adsorption process.

In various aspects, systems and methods are provided for hydrogen production while reducing and/or mitigating emissions during various refinery processes that produce syngas, such as power generation or SMR. Syngas can be effectively separated to generate high purity carbon dioxide and hydrogen streams, while reducing and/or minimizing the energy required for the separation, and without needing to reduce the temperature of the flue gas. The carbon dioxide and hydrogen then need to be separated thereby producing a high purity carbon dioxide stream—to be deposited via a CCS process—and a high purity hydrogen stream.

In some aspects, the separation of $CO_2$ and $H_2$ can be performed by using a pressure swing adsorption (PSA) process to separate the $CO_2$ and $H_2$ at the temperature and pressure of the input syngas flow. Using pressure swing adsorption to perform the separation can allow for recovery, for example, of at least about 60% (such as at least about 65%, at least about 70%, at least about 75%, at least about 80%, at least about 85%, at least about 90%, at least about 95%, at least about 97%, at least about 98%, at least about 99%, at least about 99.3%, or at least about 99.5%, or at least about 99.9%, or at least about 99.99%) of the $CO_2$ in the syngas, e.g., while also generating an $H_2$ stream with at least about 90% purity (such as at least about 93% purity, at least about 95% purity, at least about 97% purity, at least about 98% purity, or at least about 99% purity, or at least about 99.5% purity, or at least about 99.9% purity, or at least about 99.99% purity) and/or a $CO_2$ stream with at least about 80% purity (such as at least about 85% purity, at least about 90% purity, at least about 95% purity, at least about 97% purity, at least about 98% purity, at least about 99% purity, at least about 99.3% purity, or at least about 99.5% purity).

In various aspects, the operating conditions for a PSA reactor can be selected to minimize energy penalties while still effectively capturing the $CO_2$ present in syngas. The high temperature PSA can also be performed using a process cycle avoiding the need for high temperature steam and/or another energy intensive rinse gas. This can allow high purity $CO_2$ to be recovered and high purity $H_2$ while reducing/minimizing the amount of energy lost to capture of the exhaust gases.

Swing Adsorber Processes—Overview

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases, e.g. steam, can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

Multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

The method maybe carried out in a system comprising at least one equalization vessel. As is known in the art, an equalization vessel may be used to store void space gas for equalization gas with another vessel. In multiple adsorption bed configurations the equalization vessel will typically be an adsorption bed that is out of sequence with the adsorption bed being equalized. This allows for an adsorption bed to provide void space gas for another that is out of sequence for direct equalization. This is sometimes called a bed to tank equalization.

Swing Adsorber Processes—Process Cycle

In various aspects, a PSA reactor can be used for performing a separation on a stream containing $CO_2$ and $H_2$. An example of such a stream can include the syngas from refinery processing via the use of furnaces, boilers, reformers and the like. Prior to use as a feed for separation by PSA, the syngas can undergo further processing, such as condensation to remove water, combustion to remove excess fuel, adsorption for removal of $NO_x$ species, WGS to remove CO, and/or other types of processing to remove components different from $CO_2$ and $H_2$. In some aspects, the portion of the syngas used as the feed for the PSA reactor can have a water content of less than about 1.0 vol %, such as less than about 0.5 vol %. Additionally or alternately, the portion of the syngas used as the feed for the PSA reactor can have an $O_2$ content of less than about 3.0 vol %, such as less than about 1.0 vol % or less than about 0.5 vol %. Further additionally or alternately, the feed into the PSA reactor can be substantially composed of $CO_2$, CO, and $H_2$, where components of the input gas feed different from $CO_2$, CO, and $H_2$ are present in an amount of about 1.0 vol % or less each, such as less than about 0.5 vol % each. Still further additionally or alternately, in a feed substantially composed of $CO_2$, CO, and $H_2$, the combined vol % of components other than $CO_2$, CO, and $H_2$ can be about 2.0 vol % or less, such as about 1.0 vol % or less or 0.5 vol % or less.

To perform a separation, a portion of the syngas can be introduced into a PSA reactor. Depending on the source of the syngas, the syngas can have a temperature from about 300° C. to about 600° C., e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., from about 500° C. to about 600° C. Additionally or alternately, the temperature can be at least about 325° C., e.g., at least about 350° C., at least about 400° C., at least about 425° C., or at least about 440° C. Further additionally or alternately, the temperature can be about 575° C. or less, about 550° C. or less, about 500° C. or less, about 475° C. or less, about 460° C. or less, or about 440° C. or less. Still further additionally or alternately, the pressure of the syngas can be at least about 10 bara (about 1.0 MPaa), e.g., at least about 15 bara (about 1.5 MPaa), at least about 20 bara (about 2.0 MPaa), at least about 25 bara (about 2.5 MPaa), or at least about 40 bara (about 4.0 MPaa). Yet further additionally or alternately, the pressure can be about 60 bara (6.0 MPaa) or less, e.g., about 50 bara (about 5.0 MPaa) or less, about 40 bara (about 4.0 MPaa) or less, about 35 bara (about 3.5 MPaa) or less, about 40 bara (about 4.0 MPaa) or less, about 25 bara (about 2.5 MPaa) or less, or about 22.5 bara (about 2.25 MPaa) or less.

In some aspects, the syngas can be introduced into the PSA reactor at a separation temperature and a separation pressure that can correspond to the temperature and pressure of the syngas. However, some variation in temperature and/or pressure may occur between production of the syngas and introduction of the syngas into the PSA reactor. For example, the separation temperature for the portion of the syngas introduced into the PSA reactor can differ from the production temperature by about 20° C. or less, e.g., by about 15° C. or less or by about 10° C. or less. It is noted that, although having the same temperature for the separation temperature and the production temperature (i.e., a difference of approximately 0° C.) is included within the enumerated differences, in some rare embodiments the temperature differences can optionally exclude 0° C. Additionally or alternately, the separation pressure for the portion of the syngas introduced into the PSA reactor can differ from the pressure of the syngas by about 5 bar (0.5 MPa) or less, e.g., about 2 bara (0.2 MPa) or less, about 1 bara (about 0.1 MPa) or less, or about 0.5 bar (about 50 kPa) or less.

When the syngas is introduced into the PSA reactor, the $H_2$ in the exhaust stream corresponds to a "light" component while the $CO_2$ corresponds to a "heavy" component. Thus, the $H_2$ can primarily pass through the reactor while the $CO_2$ can be selectively adsorbed within the reactor. The adsorption of $CO_2$ from the feed can result in a product $H_2$ stream. The feed can be passed through the PSA reactor until one or more pre-defined criteria is satisfied for switching the feed to another PSA reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of $CO_2$ is detected in the product $H_2$ stream. Further additionally or alternately, the feed can be passed into the reactor until the amount of $CO_2$ that has entered the reactor is approximately equal to a threshold value of the adsorbent capacity of the reactor. In such a situation, for example, the feed can be passed into the reactor until the amount of $CO_2$ that has entered the reactor is equal to at least about 75% of the adsorbent capacity of the adsorbent material in the reactor, such as at least about 80%, at least about 85%, or at least about 90%. A typical PSA cycle can involve introducing feed into the reactor for about 30 seconds to about 300 seconds, e.g., for about 60 seconds to about 120 seconds.

The product $H_2$ stream can have a purity of at least about 85 vol %, e.g., at least about 88 vol %, at least about 90 vol %, at least about 92 vol %, at least about 93 vol %, at least about 94 vol %, at least about 95 vol %, at least about 96 vol %, at least about 97 vol %, at least about 98 vol %, at least about 99 vol %, or at least about 99.9 vol %, or at least about 99.99%. The pressure of the $H_2$ stream can be at least about 90%, e.g., at least about 95%, of the pressure of the syngas used as the input to the PSA reactor. Additionally or alternately, the pressure of the $H_2$ stream can differ from the separation pressure by less than about 0.5 bar (about 50 kPa), e.g., less than about 0.3 bar (about 30 kPa) or less than about 0.1 bar (about 10 kPa). Further additionally or alternately, the separation temperature for the portion of the syngas introduced into the PSA reactor can differ from the temperature of the $H_2$ product stream by about 20° C. or less, e.g., by about 15° C. or less or by about 10° C. or less. It is noted that, although having the same temperature for the separation temperature and the temperature of the syngas (i.e., a difference of approximately 0° C.) is included within the enumerated differences, in some rare embodiments the temperature differences can optionally exclude 0° C. Additionally or alternately, the temperature of the $H_2$ product stream can be at least the temperature of the PSA reactor (the adsorption temperature) during the adsorption portion of the separation cycle.

After the feed is stopped, the pressure in the PSA reactor can be reduced, e.g., using one or more blow down processes or equalizations. In a blow down process, one or both sides of a PSA reactor can be opened to allow pressure to release in the form of a blow down gas stream. The blow down gas stream can generally include a majority portion of $H_2$ and can also typically include some $CO_2$. The amount of adsorbed $CO_2$ released in the blow down process(es) can depend on the nature of the adsorbent. In some conventional PSA reactors, the blow down gas stream can be exhausted from the feed input side of the reactor. Alternatively, one or more blow down gas streams can be exhausted from the product side of the reactor. For example, one option can include having an initial blow down process exiting from the product side of the reactor followed by a second blow down process allowing a gas stream to exit from both sides of the reactor. The blow down process(es) can reduce the pressure in the reactor to a value from about 0.9 bara (about 90 kPaa) to about 3.0 bara (about 0.4 MPaa), e.g., from about 1.0 bara (about 0.1 MPaa) to about 3.0 bara (about 0.4 MPaa), from about 1.1 bara (about 110 kPaa) to about 3.0 bara (about 0.4 MPaa), from about 1.3 bara (about 130 kPaa) to about 3.0 bara (about 0.4 MPaa), from about 0.9 bara (about 90 kPaa) to about 2.6 bara (about 260 kPaa), from about 1.0 bara (about 0.1 MPaa) to about 2.6 bara (about 260 kPaa), from about 1.1 bara (about 110 kPaa) to about 2.6 bara (about 260 kPaa), from about 1.3 bara (about 130 kPaa) to about 2.6 bara (about 260 kPaa), from about 0.9 bara (about 90 kPaa) to about 2.0 bara (about 0.2 MPaa), from about 1.0 bara (about 0.1 MPaa) to about 2.0 bara (about 0.2 MPaa), from about 1.1 bara (about 110 kPaa) to about 2.0 bara (about 0.2 MPaa), or from about 1.3 bara (about 130 kPaa) to about 2.0 bara (about 0.2 MPaa). In many embodiments, maintaining a pressure above atmospheric pressure in the reactor can assist with the adsorbent retaining $CO_2$ until a subsequent purge step when desorption is desired. In some embodiments, the length of time for the blow down processes can be from about 30 seconds to about 150 seconds. At such high temperatures, a steam purge may actually be initiated with liquid water, which would vaporize upon contact with the adsorbent. This would result in increased efficiency because energy from another source would not be required to make the steam.

In some aspects, the use of multiple blow down steps can be desirable for creating blow down streams that are easier to subsequently process. For example, during adsorption of $CO_2$ from a syngas, a profile can typically develop in the reactor, with a higher content of non-adsorbed $CO_2$ near the back (input) end of the reactor and a lower content of $CO_2$ near the exit (front) end of the reactor. Based on this profile, a partial blow down from only the exit (front) end of the reactor can be used to produce a blow down output with a low $CO_2$ content. This initial blow down step can result in the higher $CO_2$ content near the back (input) end of the reactor being distributed more evenly throughout the reactor. As this occurs, it can then be more efficient to allow blow down output streams to exit from both ends of the reactor until the desired lower pressure can be achieved. Blow downs can be performed co-currently or counter-currently.

Equalization serves a dual purpose in that it transfers void space gases between adsorbent beds to raise pressure in the receiving bed while lowering pressure in transmitting bed.

Preferably, a buffer gas is not introduced into the reactor during the time between stopping the flow of exhaust gas and starting the blow down process step(s). It can additionally or alternately be preferred that the blow down process step(s) can be performed without introducing an additional gas into the reactor. Avoiding the use of buffer gases and/or additional gases in the blow down steps can be desirable, because introduction of such gases after the flow of syngas is stopped can typically result in further loss of value into a low value stream. The blow down output flow can preferably be relatively low in $CO_2$, as it can generally be desirable to retain as much $CO_2$ as possible until the start of the subsequent purge step(s). Any $CO_2$ that exits the PSA reactor as part of a blow down stream represents additional $CO_2$ in a stream other than the desired $CO_2$ product stream. This additional $CO_2$, which can typically be in low concentration, can then need to be separately handled if it is desired to achieve as high an amount of carbon capture and recovery as possible. Thus, adding additional $CO_2$ here is also not typically desirable.

After the blow down process(es), one or more purge gas flows can be used to remove the adsorbed $CO_2$ from the reactor. One option can include using a steam purge at a pressure from about 1.0 bara (about 0.1 MPaa) to about 3.0 bara (about 0.4 MPaa), e.g., from about 1.1 bara (about 110 kPaa) to about 3.0 bara (about 0.4 MPaa), from about 1.3 bara (about 130 kPaa) to about 3.0 bara (about 0.4 MPaa), from about 1.0 bara (about 0.1 MPaa) to about 2.6 bara (about 260 kPaa), from about 1.1 bara (about 110 kPaa) to about 2.6 bara (about 260 kPaa), from about 1.3 bara (about 130 kPaa) to about 2.6 bara (about 260 kPaa), from about 1.0 bara (about 0.1 MPaa) to about 2.0 bara (about 0.2 MPaa), from about 1.1 bara (about 110 kPaa) to about 2.0 bara (about 0.2 MPaa), or from about 1.3 bara (about 130 kPaa) to about 2.0 bara (about 0.2 MPaa), to assist in desorbing the $CO_2$. An alternative option can include using a steam purge at a pressure above 3.0 bara (0.4 MPaa), e.g., of at least 4.0 bara (0.4 MPaa), of at least 5.0 bara (0.5 MPaa), from above 3.0 bara (0.4 MPaa) to about 20 bara (about 2 MPaa), from above 3.0 bara (0.4 MPaa) to about 15 bara (about 1.5 MPaa), from above 3.0 bara (0.4 MPaa) to about 10 bara (about 1 MPaa), from above 3.0 bara (0.4 MPaa) to about 8 bara (about 0.8 MPaa), from above 3.0 bara (0.4 MPaa) to about 6 bara (about 0.6 MPaa), from above 3.0 bara (0.4 MPaa) to about 5 bara (about 0.5 MPaa), from 4.0 bara (0.4 MPaa) to about 20 bara (about 2 MPaa), from 4.0 bara (0.4 MPaa) to about 15 bara (about 1.5 MPaa), from 4.0 bara (0.4 MPaa) to about 10 bara (about 1 MPaa), from 4.0 bara (0.4 MPaa) to about 8 bara (about 0.8 MPaa), from 4.0 bara (0.4 MPaa) to about 6 bara (about 0.6 MPaa), from 4.0 bara (0.4 MPaa) to about 5 bara (about 0.5 MPaa), from 5.0 bara (0.5 MPaa) to about 20 bara (about 2 MPaa), from 5.0 bara (0.5 MPaa) to about 15 bara (about 1.5 MPaa), from 5.0 bara (0.5 MPaa) to about 10 bara (about 1 MPaa), from 5.0 bara (0.5 MPaa) to about 8 bara (about 0.8 MPaa), or from 5.0 bara (0.5 MPaa) to about 6 bara (about 0.6 MPaa). The steam purge can result in a product $CO_2$ output stream that can also include $H_2O$ and a lesser amount of $H_2$. In some embodiments, the steam purge can last for about 25 seconds to about 150 seconds. After removal of water, the product $CO_2$ stream can have a purity of at least about 60%, e.g., at least about 65%, at least about 70%, at least about 75%, at least about 80%, at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%. Additionally or alternately, the amount of $CO_2$ recovered can correspond to at least about 80 vol %, e.g., at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%.

The amount of steam used in the steam purge can correspond to about 1.0 moles of water or less per mole of $CO_2$ recovered, e.g., about 0.9 moles of water or less per mole of $CO_2$ recovered, about 0.75 moles of water or less per mole of $CO_2$ recovered, about 0.6 moles of water or less per mole of $CO_2$ recovered, about 0.5 moles of water or less per mole of $CO_2$ recovered, or about 0.4 moles of water or less per mole of $CO_2$ recovered. Using less steam in the purge can be beneficial, because the amount of steam used can typically correspond to the amount of energy used for the $CO_2$ recovery. It is noted that the feed can typically contain a percentage of $H_2$. Thus, a comparison of the number of moles of water per total moles of gas (including both $H_2$ and $CO_2$) in the feed could produce still lower values, e.g., about 0.5 moles of water or less per mole of gas in the feed, about 0.4 moles of water or less per mole of gas in the feed, about 0.3 moles of water or less per mole of gas in the feed, about 0.25 moles of water or less per mole of gas in the feed, about 0.2 moles of water or less per mole of gas in the feed, about 0.15 moles of water or less per mole of gas in the feed, or about 0.1 moles of water or less per mole of gas in the feed. In such embodiments where there is a non-zero amount of steam used in the steam purge, the molar ratio of steam can be at least about 0.05 moles of water or less per mole of $CO_2$ in the feed (e.g., at least about 0.1 moles of water or less per mole of $CO_2$ in the feed, at least about 0.2 moles of water or less per mole of $CO_2$ in the feed, or at least about 0.3 moles of water or less per mole of $CO_2$ in the feed) and/or can be at least about 0.01 moles of water or less per mole of gas in the feed (e.g., at least about 0.02 moles of water or less per mole of gas in the feed, at least about 0.05 moles of water or less per mole of gas in the feed, or at least about 0.1 moles of water or less per mole of gas in the feed).

FIG. 1 schematically shows an example of the gas flows into and out of a pressure swing adsorption unit suitable for use in separating an exhaust gas containing $CO_2$ and $H_2$. In FIG. 1, a pressure swing adsorption reactor 110 can receive a feed 105 containing $CO_2$ and $H_2$ for separation from a first or back side of the reactor. An $H_2$ product stream 102 can emerge from a second or forward side of the reactor. After a period of time, such as after breakthrough of the $CO_2$, the feed to the PSA can be stopped. In FIG. 1, a co-current blow down output 122 is shown. Optionally, either a counter-current blow down or both a counter-current and a co-current blow down can be used in place of a co-current blow down 122. One or more blow down processes can then be performed to reduce the pressure in the reactor. Additionally, an equalization with an equalization vessel can be used to lower pressure via equalization gas flow 135. The equalization vessel can be a separate storage tank or an out of sequence adsorbent bed in multiple bed configurations. A purge stream such as a steam purge 115 can then be introduced into the forward side of the reactor. The purge stream can assist in desorbing $CO_2$ from the adsorbent to produce the $CO_2$ product stream 112.

Figure 2:
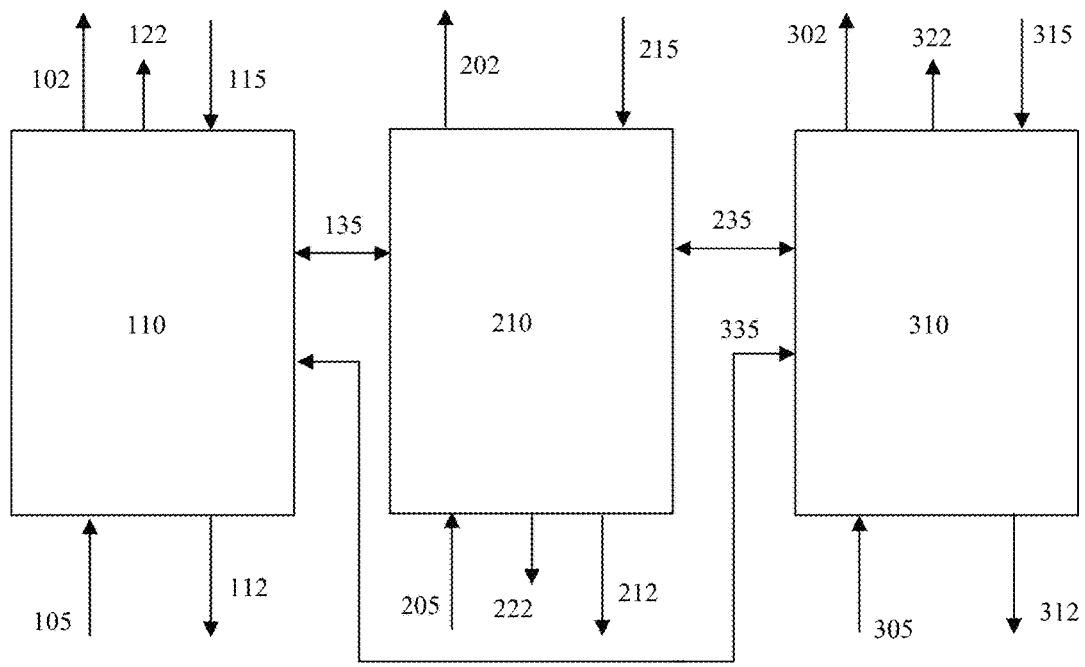
FIG. 2 schematically shows a configuration for a three adsorbent bed pressure swing adsorption process.
Figure 3:
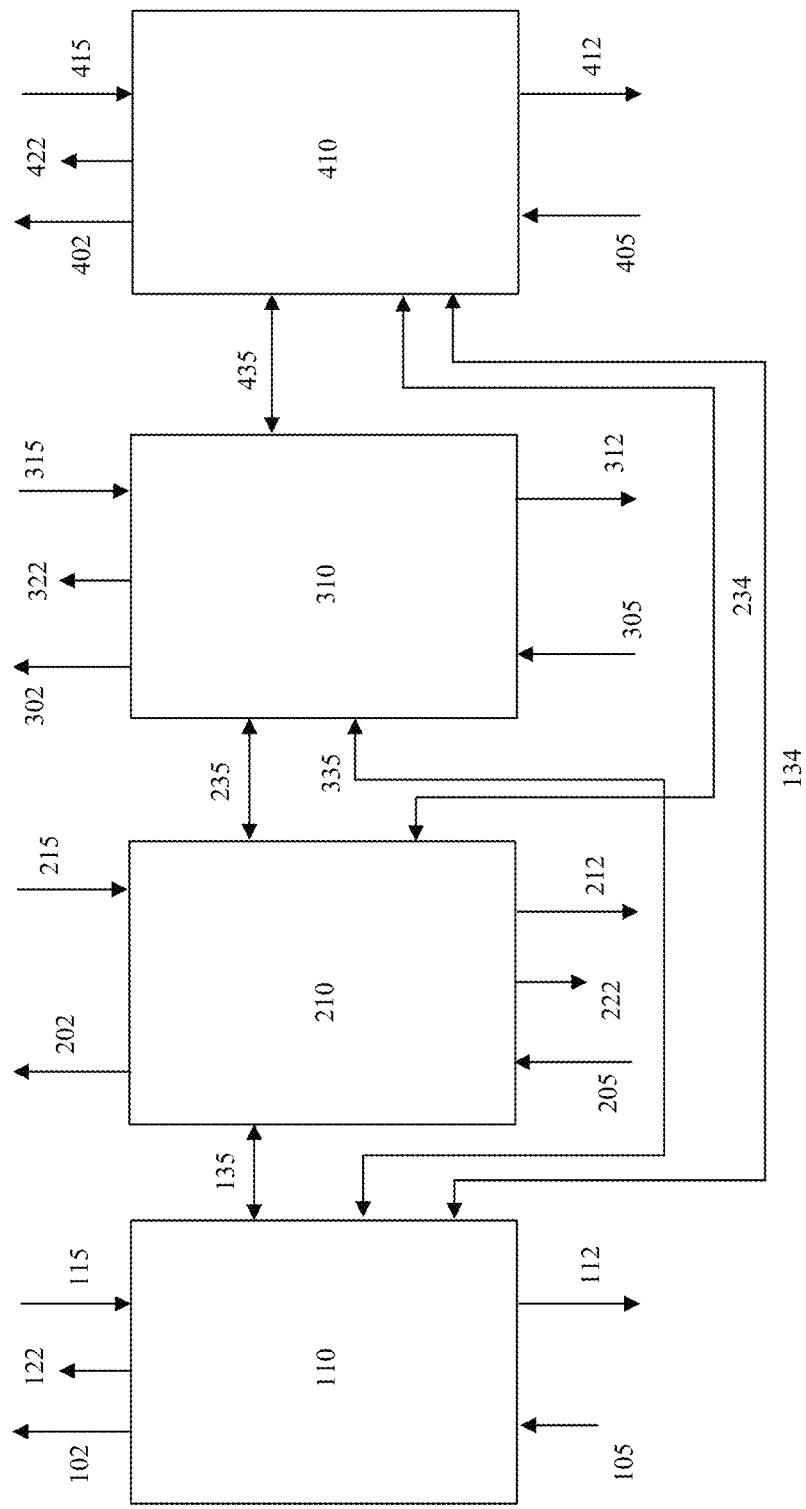
FIG. 3 schematically shows a configuration for a four adsorbent bed pressure swing adsorption process.

FIG. 2 schematically shows an example of the gas flows into and out of a three bed pressure swing adsorption unit suitable for use in separating an exhaust gas containing $CO_2$ and $H_2$. Pressure swing adsorption reactors 110, 210, and 310 can receive a feed 105, 205, and 305 containing $CO_2$ and $H_2$ for separation from a first or back side of the reactor. The feed source for each of the feeds 105, 205, and 305 into the respective reactors is typically the same and is depicted separately in the drawings for simplicity. An $H_2$ product stream 102, 202, and 302 can emerge from a second or forward side of the respective reactors. After a period of time, such as after breakthrough of the $CO_2$, the feed to the PSA can be stopped. In FIG. 2, co-current blow down outputs 122 and 322 are shown for reactors 110 and 310 respectively. Counter-current blowdown output 222 is shown for reactor 210. Additionally, equalization gas flow 135, 235, and 335 are shown between reactors 110 and 210, 210 and 310, and 110 and 310 respectively. A purge stream such as a steam purge 115, 215, and 315 can then be introduced into the forward side of the reactors. The purge stream can assist in desorbing $CO_2$ from the adsorbent to produce the $CO_2$ product stream 112, 212, and 312. FIG. 3 schematically shows a four bed pressure swing adsorption configuration, which is described in more detail in the Examples below.

Figure 4:
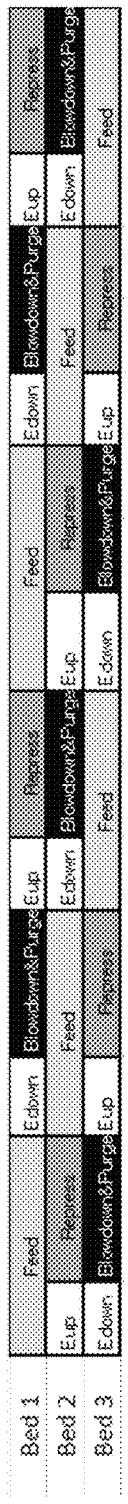
FIG. 4 pictorially shows a prior art cycle setup of a 3-vessel sorptive arrangement with interconnection between vessels.
Figure 5:
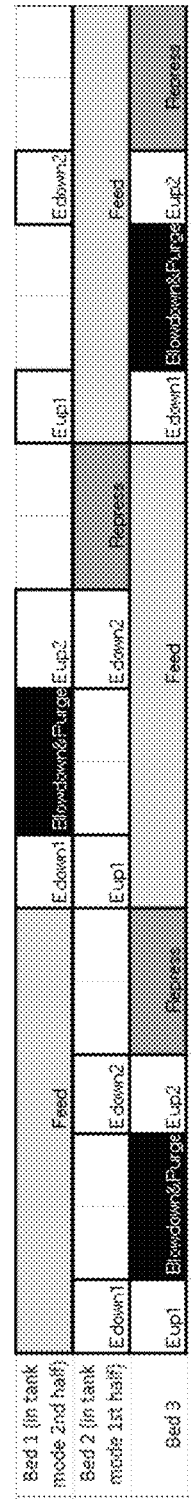
FIG. 5 pictorially shows the cycle setup of a 3-vessel sorptive arrangement with interconnection between vessels and one vessel of the cycle being utilized as a storage tank only.

In certain aspects, three and four bed adsorption bed configurations can be employed where, in sequence, any one of the beds is utilized strictly as a storage vessel for one-third (three beds) or one-fourth (four beds) of the overall cycle time. This allows the system to increase the duration of feed step time, while simultaneously reducing the overall number of blow down/purge steps as well as the number of repressurization steps per cycle as compared to a conventional three or four bed system. Referring to FIG. 4, which depicts a conventional three bed system, each bed is not considered to be held as a storage vessel, other than for the purpose of equalization steps that are integrated into the cycle. FIG. 5 depicts a three bed system where one bed is utilized strictly as a storage vessel. As can be seen, FIG. 4 has twice the number of blowdown and purge steps as well as twice the number of repressurizations compared to the cycle of FIG. 5. The four bed case is shown in FIG. 8 and described further in the Examples below.

Utilizing at least one bed in a cycle as strictly a storage vessel also provides an advantage over the prior art case that simply uses an empty tank as a storage vessel. Adsorption and desorption can occur in the bed that is behaving as tank. Therefore, when the bed/tank supplies equalization gas to another tank, this gas will be enriched with the less adsorbed species (e.g. $H_2$) which improves the quality of repressurization.

Figures 7, 8:
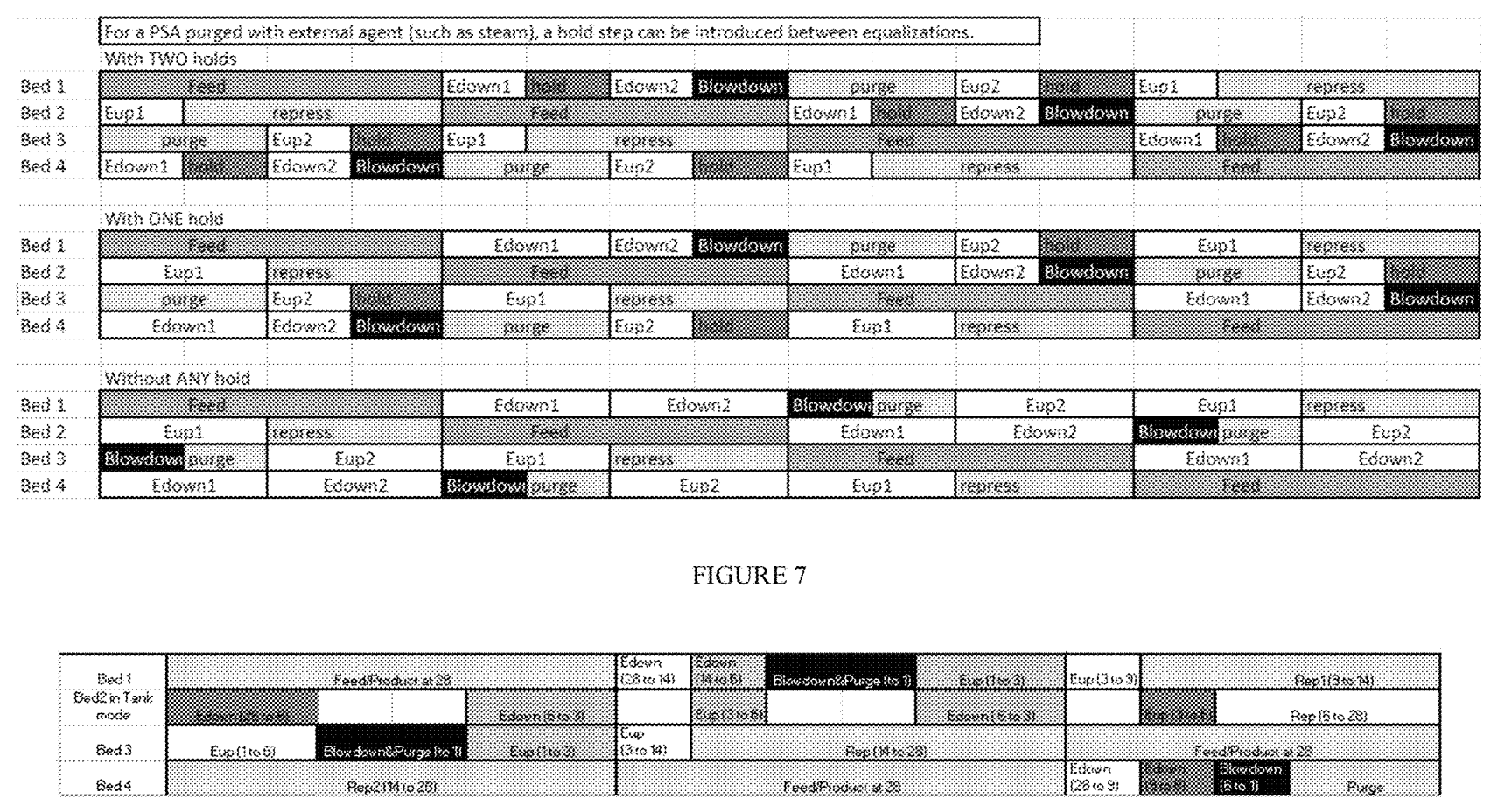

FIG. 7 depicts three different sequences for employment of a four bed system purged with an external agent, e.g. steam. The three sequences introduce either one, two, or zero "hold" steps. The hold steps allow for longer equalization times throughout the cycle. Longer equalization times are more conducive to a stable process. As can be seen, however, using an external feed with no holds comes at the expense of the steam purge duration. Efficacy of steam to do its purge should be considered as steam purging is an efficient means of SEWGS adsorbent cleaning. In many cases, the depiction of the "one hold" sequence of FIG. 7 will be preferred because it provides good steam purge duration and also allows for stabilization of the first equalization of a quarter cycle, which will have the highest pressure change.

Swing Adsorber Processes—Reactor Configuration

Beds of adsorbent can be arranged in any convenient manner to provide a flow path for gas, including axial and/or radial flow directions. The vessels holding the bed of adsorbent can be oriented with respect to flow direction in any convenient manner. One typical orientation for a PSA reactor can be to have a reactor where the direction of flow is aligned with the long or primary axis of the reactor. An example of this includes having PSA reactors in the form of vertical cylinders, where the input gas flow enters the cylinder through the top or bottom surface. While this can represent a conventional configuration for a PSA reactor relative to the direction of gas flow, scaling up a process to handle large flow volumes can pose difficulties. For example, a typical length to diameter ratio for a PSA reactor can be about 3 to 1, such as a reactor with a length of about 10 meters and a diameter of about 3 meters. Increasing the size of such a reactor can generally result in an increasing pressure drop across the reactor, which is typically not desirable. Thus, in order to scale up axial flow PSA reactors to handle large gas flows, multiple reactors can typically be used.

Additionally or alternately, a PSA reactor can be used where the long or primary axis of the reactor can be perpendicular to the direction of gas flow. For example, a PSA reactor can include parallel plates of adsorbent with the long axis of the parallel plates being perpendicular to the direction of gas flow. This can allow a much larger volume of adsorbent for capturing $CO_2$ to be placed in a single reactor with an axial flow orientation while reducing the distance the gas flow must travel to cross the reactor. As a result, this type of configuration can reduce the pressure drop across a PSA reactor while still handling large volumes of input gas flow. This can reduce the number of separate reactors required to handle a large flow.

As an example, a horizontally oriented PSA reactor can have parallel plates of adsorbent of approximately rectangular shape, e.g., with a long axis of about 30 meters and a short axis of about 4 meters. In the horizontal configuration, the input gas can be introduced to flow across the short axis. This can be accomplished by introducing the input gas at several locations along a side of the reactor corresponding to the long axis. Flow distributors can then be used inside the PSA reactor so that the input gas can be distributed along the entire length of the long axis. For large gas flow rates, the pressure drop from distributing the feed across the long axis of a PSA reactor can be lower than attempting to force such a large gas flow rate through a plurality of conventional axial flow PSA reactors.

Swing Adsorber Processes—Adsorbent Materials

In various aspects, a swing adsorption process can be performed to separate $H_2$ from $CO_2$ in syngas at a temperature and pressure of the syngas. For example, the syngas can have a temperature from about 300° C. to about 600° C. (e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., or from about 500° C. to about 600° C.; additionally or alternately, the temperature can be at least about 325° C., e.g., at least about 350° C., at least about 400° C., at least about 425° C., or at least about 440° C.; further additionally or alternately, the temperature can be about 575° C. or less, about 550° C. or less, about 500° C. or less, about 475° C. or less, about 460° C. or less, or about 440° C. or less) and a pressure from about 10 bara (about 1.0 MPaa) to about 60 bara (about 6.0 MPaa) (e.g., a pressure of at least about 10 bara (about 1.0 MPaa), at least about 15 bara (about 1.5 MPaa), at least about 20 bara (about 2.0 MPaa), at least about 25 bara (about 2.5 MPaa), or at least about 40 bara (about 4.0 MPaa) and/or a pressure of about 60 bara (6.0 MPaa) or less, about 50 bara (about 5.0 MPaa) or less, about 40 bara (about 4.0 MPaa) or less, about 35 bara (about 3.5 MPaa) or less, about 40 bara (about 4.0 MPaa) or less, about 25 bara (about 2.5 MPaa) or less, or about 22.5 bara (about 2.25 MPaa) or less).

As noted above, one goal of the separation process can be to perform the separation under conditions compatible with whatever process produced the syngas. Thus, it can be desirable to perform the separation at approximately the temperature and pressure of the syngas. In order to accomplish a separation at the conditions of the syngas, the adsorbent material in the pressure swing adsorber reactor should generally be effective under such conditions.

One example of a suitable adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide. Additionally or alternatively, it may be advantageous to incorporate graphene complexes into the metal oxides to assist in adsorption.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

In using such materials at high temperatures, it has been found that the WGS reaction and $CO_2$ adsorption can occur nearly simultaneously.

In another aspect, the adsorbent particles can be assembled into an ordered structure such as a monolith. Conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can then be placed in the vessel with the gas passages aligned in the desired orientation to form an ordered adsorbent bed. The void fraction within the adsorbent—that is, the ratio of the void volume due to porosity of solid adsorbents (including micropores and macropores) and also void volume due to gas flow channels or interstices to the volume of the vessel containing the adsorbent—should be less than 0.5, or less than 0.3.

OTHER EMBODIMENTS

Additionally or alternatively, the present invention can include one or more of the following embodiments.

Embodiment 1

A method for production of $H_2$ and $CO_2$ from a gaseous stream, comprising: passing a gaseous stream comprising at least about 60 vol % $H_2$ and at least about 10 vol % $CO_2$ into a swing adsorption reactor comprising a plurality of adsorbent beds containing an adsorbent material, the gaseous stream having a pressure between about 10 bara (about 1.0 MPaa) to about 40 bara (about 4.0 MPaa); in a first adsorbent bed, adsorbing $CO_2$ on the adsorbent material at an adsorption temperature of at least 400° C.; wherein the adsorbent material comprises an one of an (i) alkali metal carbonate and an oxide of an alkaline earth metal or a transition metal and (ii) alkaline earth metal carbonate and an oxide of a transition metal; recovering an $H_2$ stream with a purity of at least about 99 vol % from a forward end of the first adsorbent bed, the recovered $H_2$ stream having a pressure that differs from the pressure of the gaseous stream by about 0.5 bar (about 50 kPa) or less; reducing the pressure in the first adsorbent bed to a pressure from about 5 bara (about 500 kPaa) to about 15 bara (1.5 MPaa) by equalizing the first adsorbent bed with a another of the plurality of adsorbent beds via equalization piping; further reducing the pressure the pressure in the first adsorbent bed to a pressure from about 1.0 bara (about 0.1 MPaa) to about 4.0 bara (about 0.4 MPaa) by outputting a blow down stream from at least one end of the first adsorbent bed; and purging the first adsorbent bed with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the gaseous stream, the steam purge containing less than about 1.0 moles of $H_2O$ per mole of $CO_2$ recovered.

Embodiment 2

The method of embodiment 1, wherein the passing, the adsorbing, the recovering, the reducing, further reducing, and the purging comprise a pressure swing adsorption cycle, the gaseous stream and the steam purge comprising at least about 95 vol % of the gases introduced into the swing adsorption reactor during the pressure swing adsorption cycle.

Embodiment 3

The method of any of the previous embodiments, further comprising repressurizing the first adsorbent bed to a pressure of at least about 10 bara (about 1.0 MPaa) with the gaseous stream.

Embodiment 4

The method of any of the previous embodiments, wherein the steam purge contains less than 0.8 moles of $H_2O$ per mole of $CO_2$ recovered.

Embodiment 5

The method of any of the previous embodiments, wherein the steam purge contains less than 0.6 moles of $H_2O$ per mole of $CO_2$ recovered.

Embodiment 6

The method of any of the previous embodiments, wherein reducing the pressure in the first adsorbent bed comprises outputting a first co-current blow down stream.

Embodiment 7

The method of any of the previous embodiments, wherein reducing the pressure in the first adsorbent bed further comprises outputting a second counter-current blowdown stream.

Embodiment 8

The method of any of the previous embodiments, wherein the alkali metal carbonate is potassium carbonate, lithium carbonate, or sodium carbonate.

Embodiment 9

The method of any of the previous embodiments, wherein the adsorbent comprises a transition metal oxide of a transition metal that forms an oxide with the metal in a +2 or +3 oxidation state.

Embodiment 10

The method of any of the previous embodiments, wherein the adsorbent comprises at least one of lithium carbonate and potassium carbonate and at least one of lanthanum oxide, yttrium oxide, and magnesium oxide.

Embodiment 11

The method of any of the previous embodiments, wherein the alkaline earth metal carbonate is magnesium carbonate or calcium carbonate.

Embodiment 12

The method of any of the previous embodiments, wherein the adsorbent comprises at least one of magnesium carbonate and calcium carbonate and at least one of lanthanum oxide, yttrium oxide, and magnesium oxide.

Embodiment 13

The method of any of the previous embodiments, wherein the steam purge is initiated by contacting the adsorbent material with liquid water, the adsorbent material thereby producing steam for the steam purge.

Embodiment 14

The method of any of the previous embodiments, where the adsorbent in the reactor is organized as a structure, said structure possessing a void fraction less than 0.3.

Embodiment 15

The method of any of the previous embodiments, wherein the swing adsorption reactor comprises three adsorbent beds, wherein during any one third of a cycle, one of the adsorbent beds is used only as storage vessel.

Embodiment 16

The method of any of the previous embodiments, wherein the swing adsorption reactor comprises four adsorbent beds, wherein during any one quarter of a cycle, one of the adsorbent beds is used only as storage vessel.

Embodiment 17

The method of any of the previous embodiments, wherein the swing adsorption reactor comprises four adsorbent beds, wherein prior to the repressurizing, the first adsorbent bed increases its pressure via equalization with a second adsorbent bed and a third adsorbent bed.

Embodiment 18

The method of any of the previous embodiments, wherein the swing adsorption reactor comprises four adsorbent beds, further comprising holding the first adsorbent bed for a period of time during which a second adsorbent bed, a third adsorbent bed, and a fourth adsorbent bed are engaged in a blowdown, feeding, and repressurizing step, respectively.

EXAMPLES

Example 1—Performing Pressure Swing Adsorption on a Portion of Syngas

The following predictive example is based on a configuration for a pressure swing adsorption reactor similar to the configuration shown in FIG. 2. In this example, a mixed-metal oxide based adsorbent is used in a plurality of PSA reactors to separate $CO_2$ and $H_2$. The separation is performed at a temperature between about 400° C. and about 500° C. The PSA reactors correspond to multiple horizontally aligned vessels, such as 3 or 4 vessels. The reactors include an adsorbent configuration suitable for use in a horizontal alignment for input flow perpendicular to the long axis of the reactor, such as parallel plate adsorbents. The reactor vessels have about a 7.5 to 1 length to width ratio, corresponding to a long axis of about 30 meters and a short axis of about 4 meters. The reactors are deployed in a cycle which includes a sequence of steps. The first step in the cycle is a feed step at high pressure, such as ~28 bara (about 2.8 MPaa), for ~60-150 seconds during which feed gas is supplied to a feed end of a PSA reactor vessel. An example of a feed gas is syngas. The syngas can be delivered to the PSA vessel at a temperature of ~440° C. An example of a turbine exhaust gas composition can be about 10-15% vol % carbon dioxide, about 60-80 vol % $H_2$, 5-30 vol % carbon monoxide and a remaining amount of water and other trace species. As the feed gas is supplied to a feed end of the vessel, a hydrogen product is produced from a product side. The hydrogen product can have a purity of at least about 90 vol %, a temperature of about 440° C., and a pressure of about 20.7 bara (about 2.07 MPaa). After a sufficient amount of $CO_2$ is adsorbed, such as about 85% of the capacity of the adsorbent, an equalization$_{down}$ step is performed to lower the pressure of the spent bed and repressurize a different bed in the cycle. The equalization$_{down}$ step can be performed for about 20-100 seconds. At the end of the equalization$_{down}$ step, the reactor vessel is at a pressure of about 14 bara (about 1.4 MPaa). Following equalization, a blow down step is started. The blow down step can be performed for about 30-150 seconds. At the end of the blow down step, the reactor vessel is at a pressure of about 1.3 bara (about 130 kPaa) to about 1.6 bara (about 160 kPaa). The blowdown can be performed either solely in the co-current direction where only the product end is opened, or a first blowdown in the co-current direction can be performed followed by a second blowdown in the counter-current direction. For example, for the results predicted below, a first co-current blow down is performed for about 10 to 20 seconds followed by a second counter-current blow down for about 130 to 140 seconds. After the blow down, a low pressure steam purge from the product side can be performed for about 35-135 seconds to sweep out adsorbed carbon dioxide. The low pressure steam purge generates an output stream containing water and carbon dioxide. After removal of water, the output stream can have a $CO_2$ purity of at least about 90 vol %. The output stream can also correspond to at least about 90% (by weight) of the $CO_2$ present in the feed to the PSA reactor. The vessel is then partially repressurized via an equalization$_{up}$ step from another reactor vessel at a different stage of the cycle. The equalization$_{up}$ step can be performed for about 20-100 seconds. The equalization step can raise the pressure in the reactor to about 14 bara (1.4 MPaa). The vessel is then fully repressurized from the feed side or the product side to return the PSA reactor vessel to the initial pressure for performing the separation of the feed gas. The repressurization can be performed using the feed gas or product gas or using both simultaneously from each side and can typically take about 20-150 seconds. The conduct of this PSA cycle can allow separation of carbon dioxide from hydrogen contained in a syngas, such that carbon dioxide is recovered at a rate of at least 90% and with a purity of at least 85% (after condensing out water) while also simultaneously producing hydrogen at greater than 99 vol % purity. The cycle can also use a reduced amount of steam, such as from about 0.3 to about 0.6 mol of steam per mol of carbon dioxide recovered.

Example 2—Performing PSA on a Syngas for High Purity $CO_2$ and $H_2$

The following prophetic example is based on a configuration for a pressure swing adsorption reactor similar to the configuration shown in FIG. 3. The cycle sequence follows that depicted in FIG. 6. In this example, four PSA reactors are used to separate $CO_2$ and $H_2$. Four vessels each of 3.66 m diameter and length of 12.2 m were filled with an adsorbent selective for $CO_2$ as well as possessing water-gas shift (WGS) capability. Adsorbents for this purpose can be chosen from mixed metal oxides, hydrotalcites or combination of these. The vessels were subjected to the cycle described below with feed at a composition of 26% $CO_2$, 68% $H_2$, and 6% $H_2O$ which is typical for syngas feed where all CO has been converted to $CO_2$. This conversion of CO is a feature of the WGS adsorbent. Feed pressure was 28 bar and feed temperature was 400 C at feed rate of 38780 kg/hr. These conditions and values are typical and are only meant to be illustrative. Various other pressures and times associated with the cycle steps are possible.

Figure 6:
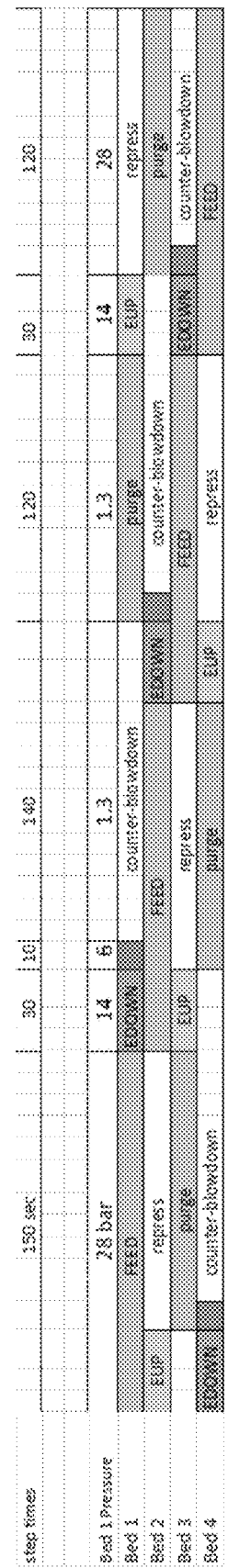
FIG. 6 pictorially shows a representative cycle setup of a 4-vessel sorptive arrangement with some level of interconnection between vessels.

The reactors were deployed in a cycle including the following sequence of steps referenced in FIG. 6. For simplicity, cycle steps will be recited with respect to adsorbent bed one, but it is understood that beds two, three, and four follow a similar cycle out of phase with adsorbent bed one and each other. Referring to FIG. 3 and FIG. 6, adsorbent bed one receives feed 105, e.g. syngas, at relatively high pressure, ~28 bara (~2.8 MPaa), for 150 seconds to a feed end of a PSA reactor vessel. As the feed gas is supplied to a feed end of the vessel, a hydrogen product stream 102 can be produced from a product side. After 150 seconds an equalization$_{down}$ step was started via equalization gas flow 335 with adsorbent bed three. The equalization$_{down}$ step was performed for ~30 seconds and brought the reactor vessel to a pressure of about 14 bara (1.4 MPaa). After the equalization$_{down}$ step, a first co-current blowdown step was performed for about 15 seconds via blowdown 122. At the end of the first blow down step, the reactor vessel was at a pressure of about 6 bara (~600 kPaa). Next, a second counter-current blowdown (not shown) was performed for about 140 seconds. At the end of the second blow down step, the reactor vessel was at a pressure about of about 1.3 bara (130 kPaa). Other combinations of these sequences of blow down are additionally or alternately possible. After the blowdown(s), a relatively low pressure steam purge 115 (about 1-1.5 bara, ~100-150 kPaa) from the product side was performed for about 120 seconds to sweep out adsorbed carbon dioxide. The vessel was then partially repressurized via an equalization$_{up}$ step via equalization gas flow 335 with adsorbent bed three (in the opposite direction as the previous equalization). The equalization$_{up}$ step was performed for about 30 seconds. The equalization$_{up}$ step raised the pressure in the reactor to about 14 bara (1.4 MPaa). The vessel was then be repressurized from the feed side to return the PSA reactor vessel to the initial pressure of ~28 bara (~2.8 MPaa) for performing the separation of the feed gas. The repressurization can be performed using product gas for ~120 seconds.

A numerical simulation (i.e. computer-based simultaneous solution of the transient equations for mass and energy balances) based on the cycle and the conditions and properties described, gave the following solution for the performance of the system at the converged, periodic state:

$H_2$ effective purity of 99.99%, $H_2$ recovery of 81%, $CO_2$ effective purity 88.56% and $CO_2$ recovery of 99.96% with Steam consumption (mol $H_2O$/mol $CO_2$ recovered) of 0.56.

The steam usage of 0.56 (m/m) for this process is substantially lower than anything disclosed in the prior art which uses 3 or 4 vessels.

Example 3—3-Vessel PSA Configuration Using One Vessel as a Storage Tank

FIG. 2 shows a 3-vessel configuration that is illustrative but not limiting of one possible arrangement of adsorber vessels within the scope of the invention. FIG. 4 depicts a prior art employment of a 3-vessel configuration, which does not use one of the vessels as a storage tank. FIG. 5 depicts employment of a 3-vessel configuration using one of the vessels as a storage tank. The time units provided are arbitrary for the purposes of explaining the cycle and will be referred here simply as a "time unit." Each column in FIG. 5 equals one time unit. Feed stream 105 is provided to adsorbent bed 110 for six time units producing hydrogen product stream 102. Meanwhile, adsorbent bed 210, acting as a storage vessel, and adsorbent bed 310 are engaged in an equalization step via equalization gas flow 235 for one time unit. After equalization$_{up}$, adsorbent bed 310 undergoes a blowdown 322 and purge 315 for two time units creating a $CO_2$ product stream 312. Then, adsorbent bed 210, acting as a storage vessel, and adsorbent bed 310 engage in a second equalization step via equalization gas flow 235 for one time unit. Adsorbent bed 310 is then repressurized for two time units from the feed inlet in preparation for receiving feed stream 305.

Adsorbent bed 310 then receives feed stream 305 for six time units producing hydrogen product stream 302. Meanwhile, adsorbent bed 210, acting as a storage vessel, and adsorbent bed 110 are engaged in an equalization step via equalization gas flow 135 for one time unit. After equalization$_{down}$, adsorbent bed 110 undergoes a blowdown 122 and purge 115 for two time units creating a $CO_2$ product stream 112. Then, adsorbent bed 210, acting as a storage vessel, and adsorbent bed 110 engage in a second equalization step via equalization gas flow 135 for one time unit. Adsorbent bed 210 is then repressurized for two time units from the feed inlet in preparation for receiving feed stream 205.

Adsorbent bed 210 then receives feed stream 205 for six time units producing hydrogen product stream 202. Meanwhile, adsorbent bed 110, acting as a storage vessel, and adsorbent bed 310 are engaged in an equalization step via equalization gas flow 335 for one time unit. After equalization$_{down}$, adsorbent bed 310 undergoes a blowdown 322 and purge 315 for two time units creating a $CO_2$ product stream 312. Then, adsorbent bed 110, acting as a storage vessel, and adsorbent bed 310 engage in a second equalization step via equalization gas flow 335 for one time unit. Adsorbent bed 310 is then repressurized for two time units from the feed inlet in preparation for receiving feed stream 305.

As can be seen, FIG. 4 spends twice the number of time units blowing down and purging with the same amount of feed time as FIG. 5. Thus, the sequencing of FIG. 5 allows for a much lower steam penalty with the same or similar amount of hydrogen and carbon dioxide production.

Example 4—4-Vessel PSA Configuration Using One Vessel as a Storage Tank

FIGS. 3 and 8 show 4-vessel configurations that are illustrative but not limiting of another possible arrangement of adsorber vessels within the scope of the invention. FIG. 8 depicts employment of a 4-vessel configuration using one of the vessels as a storage tank—in this case adsorbent bed two. The time units provided are arbitrary for the purposes of explaining the cycle and will be referred here simply as a "time unit." Each column in FIG. 8 equals one time unit. Feed stream 105 is provided to adsorbent bed 110 for six time units producing hydrogen product stream 102. Meanwhile, adsorbent bed 210, acting as a storage vessel, and adsorbent bed 310 are engaged in an equalization step via equalization gas flow 235 for two time units. After equalization$_{up}$, adsorbent bed 310 undergoes a blowdown 322 and purge 315 for two time units creating a $CO_2$ product stream 312. Then, adsorbent bed 210, acting as a storage vessel, and adsorbent bed 310 engage in a second equalization step via equalization gas flow 235 for two time units. While adsorbent bed 110 is feeding, adsorbent bed 410 is repressurized for six time units from the feed inlet in preparation for receiving feed stream 405.

Adsorbent bed 410 then receives feed stream 405 for six time units producing hydrogen product stream 402. Meanwhile, adsorbent bed 110 and adsorbent bed 310 are engaged in an equalization step via equalization gas flow 335 for one time unit. After equalization$_{up}$ with adsorbent bed 110, adsorbent bed 310 is then repressurized for five time units from the feed inlet in preparation for receiving feed stream 305. After equalization$_{down}$ with adsorbent bed 310, adsorbent bed 110 undergoes a second equalization$_{down}$ with adsorbent bed 210 via equalization gas flow 135 for one time unit. Next, adsorbent bed 110 undergoes a blowdown 122 and purge 115 for two time units creating a $CO_2$ product stream 112. Then, adsorbent bed 210, acting as a storage vessel, and adsorbent bed 110 engage in a second equalization step via equalization gas flow 135 for two time units.

Adsorbent bed 310 then receives feed stream 305 for six time units producing hydrogen product stream 302. Meanwhile, adsorbent bed 110 and adsorbent bed 410 are engaged in an equalization step via equalization gas flow 134 for one time unit. After equalization$_{up}$ with adsorbent bed 410, adsorbent bed 110 is then repressurized for five time units from the feed inlet in preparation for receiving feed stream 105. After equalization$_{down}$ with adsorbent bed 110, adsorbent bed 410 undergoes a second equalization$_{down}$ with adsorbent bed 210 via equalization gas flow 234 for one time unit. Next, adsorbent bed 410 undergoes a blowdown 422 for one time unit and purge 415 for two time units creating a $CO_2$ product stream 412.

Example 5—4-Vessel PSA Configuration Using a Hold(s)

FIGS. 3 and 7 show 4-vessel configurations that are illustrative but not limiting of another possible arrangement of adsorber vessels within the scope of the invention. FIG. 7 depicts employment of a 4-vessel configuration using one, two, or zero "holds." The one hold cycle is described in detail here, but two hold and zero hold cycles are easily discernible based on the figure provided. The time units provided are arbitrary for the purposes of explaining the cycle and will be referred here simply as a "time unit." Each column in FIG. 7 equals one time unit. Feed stream 105 is provided to adsorbent bed 110 for four time units producing hydrogen product stream 102. Meanwhile, adsorbent bed 210 and adsorbent bed 410 are engaged in an equalization step via equalization gas flow 234 for two time units. After equalization$_{up}$, adsorbent bed 210 undergoes a repressurization for two time units from the feed inlet in preparation for feed stream 205. Adsorbent bed 310 begins its portion of the quarter cycle by purging via purge 315 for two time units producing $CO_2$ product stream 312. Following purge 315, adsorbent bed 310 and adsorbent bed 410 engage in an equalization step via equalization gas flow 435 for one time unit. Adsorbent bed 310 then holds for one time unit, while adsorbent bed 410 conducts a blowdown 422 for one time unit.

Adsorbent bed 210 then receives feed stream 205 for four time units producing hydrogen product stream 202. Meanwhile, adsorbent bed 110 and adsorbent bed 310 are engaged in an equalization step via equalization gas flow 335 for two time units. After equalization$_{up}$, adsorbent bed 310 undergoes a repressurization for two time units from the feed inlet in preparation for feed stream 305. Adsorbent bed 410 begins its portion of the quarter cycle by purging via purge 415 for two time units producing $CO_2$ product stream 412. Following purge 415, adsorbent bed 410 and adsorbent bed 110 engage in an equalization step via equalization gas flow 134 for one time unit. Adsorbent bed 410 then holds for one time unit, while adsorbent bed 110 conducts a blowdown 122 for one time unit.

Adsorbent bed 310 then receives feed stream 305 for four time units producing hydrogen product stream 302. Meanwhile, adsorbent bed 210 and adsorbent bed 410 are engaged in an equalization step via equalization gas flow 234 for two time units. After equalization$_{up}$, adsorbent bed 410 undergoes a repressurization for two time units from the feed inlet in preparation for feed stream 405. Adsorbent bed 110 begins its portion of the quarter cycle by purging via purge 115 for two time units producing $CO_2$ product stream 112. Following purge 115, adsorbent bed 110 and adsorbent bed 210 engage in an equalization step via equalization gas flow 135 for one time unit. Adsorbent bed 110 then holds for one time unit, while adsorbent bed 210 conducts a blowdown 222 for one time unit.

Adsorbent bed 410 then receives feed stream 405 for four time units producing hydrogen product stream 402. Meanwhile, adsorbent bed 110 and adsorbent bed 310 are engaged in an equalization step via equalization gas flow 335 for two time units. After equalization$_{up}$, adsorbent bed 110 undergoes a repressurization for two time units from the feed inlet in preparation for feed stream 105. Adsorbent bed 210 begins its portion of the quarter cycle by purging via purge 215 for two time units producing $CO_2$ product stream 212. Following purge 215, adsorbent bed 210 and adsorbent bed 310 engage in an equalization step via equalization gas flow 235 for one time unit. Adsorbent bed 210 then holds for one time unit, while adsorbent bed 310 conducts a blowdown 322 for one time unit.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for production of $H_2$ and $CO_2$ from a gaseous stream, comprising:
    passing a gaseous stream comprising at least about 60 vol % $H_2$ and at least about 10 vol % $CO_2$ into a pressure swing adsorption reactor comprising a plurality of adsorbent beds containing an adsorbent material, the gaseous stream having a pressure between about 10 bara (about 1.0 MPaa) to about 40 bara (about 4.0 MPaa);
    in a first adsorbent bed, adsorbing $CO_2$ on the adsorbent material at an adsorption temperature of at least 400° C.; wherein the adsorbent material comprises an one of an (i) alkali metal carbonate and an oxide of an alkaline earth metal or a transition metal and (ii) alkaline earth metal carbonate and an oxide of a transition metal;
    recovering an $H_2$ stream with a purity of at least about 99 vol % from a forward end of the first adsorbent bed, the recovered $H_2$ stream having a pressure that differs from the pressure of the gaseous stream by about 0.5 bar (about 50 kPa) or less;
    reducing the pressure in the first adsorbent bed to a pressure from about 5 bara (about 500 kPaa) to about 15 bara (1.5 MPaa) by equalizing the first adsorbent bed with other adsorption beds of the plurality of adsorbent beds via equalization piping;
    further reducing the pressure in the first adsorbent bed to a pressure from about 1.0 bara (about 0.1 MPaa) to about 4.0 bara (about 0.4 MPaa) by outputting a blow downstream from at least one end of the first adsorbent bed; and
    purging the first adsorbent bed with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the gaseous stream, the steam purge containing less than about 1.0 moles of $H_2O$ per mole of $CO_2$ recovered; wherein the passing, the adsorbing, the recovering, the reducing, further reducing, and the purging comprise a pressure swing adsorption cycle; and wherein one of the plurality of adsorption beds is used solely as a storage vessel at any one point in the pressure swing adsorption cycle.

2. The method of claim 1, wherein the gaseous stream and the steam purge comprising at least about 95 vol % of the gases introduced into the swing adsorption reactor during the pressure swing adsorption cycle.

3. The method of claim 1, further comprising repressurizing the first adsorbent bed to a pressure of at least about 10 bara (about 1.0 MPaa) with the gaseous stream.

4. The method of claim 1, wherein the steam purge contains less than 0.8 moles of $H_2O$ per mole of $CO_2$ recovered.

5. The method of claim 1, wherein the steam purge contains less than 0.6 moles of $H_2O$ per mole of $CO_2$ recovered.

6. The method of claim 1, wherein reducing the pressure in the first adsorbent bed comprises outputting a first co-current blow down stream.

7. The method of claim 6, wherein reducing the pressure in the first adsorbent bed further comprises outputting a second counter-current blowdown stream.

8. The method of claim 1, wherein the alkali metal carbonate is potassium carbonate, lithium carbonate, or sodium carbonate.

9. The method of claim 1, wherein the adsorbent comprises a transition metal oxide of a transition metal that forms an oxide with the metal in a +2 or +3 oxidation state.

10. The method of claim 1, wherein the adsorbent comprises at least one of lithium carbonate and potassium carbonate and at least one of lanthanum oxide, yttrium oxide, and magnesium oxide.

11. The method of claim 1, wherein the alkaline earth metal carbonate is magnesium carbonate or calcium carbonate.

12. The method of claim 1, wherein the adsorbent comprises at least one of magnesium carbonate and calcium carbonate and at least one of lanthanum oxide, yttrium oxide, and magnesium oxide.

13. The method of claim 1, wherein the steam purge is initiated by contacting the adsorbent material with liquid water, the adsorbent material thereby producing steam for the steam purge.

14. The method of claim 1, where the adsorbent in the reactor is organized as a structure, said structure possessing a void fraction less than 0.3.

15. The method of claim 1, wherein the swing adsorption reactor comprises three adsorbent beds, wherein during any one third of the pressure swing adsorption cycle, one of the adsorbent beds is used only as storage vessel.

16. The method of claim 1, wherein the swing adsorption reactor comprises four adsorbent beds, wherein during any one quarter of the pressure swing adsorption cycle, one of the adsorbent beds is used only as storage vessel.

17. The method of claim 3, wherein the swing adsorption reactor comprises four adsorbent beds, wherein prior to the repressurizing, the first adsorbent bed increases its pressure via equalization with a second adsorbent bed and a third adsorbent bed.

18. The method of claim 1, wherein the swing adsorption reactor comprises four adsorbent beds, further comprising holding the first adsorbent bed for a period of time during which a second adsorbent bed, a third adsorbent bed, and a fourth adsorbent bed are engaged in a blowdown, feeding, and repressurizing step, respectively.

* * * * *